(12) United States Patent
Kojima

(10) Patent No.: US 10,979,588 B2
(45) Date of Patent: Apr. 13, 2021

(54) IMAGE FORMING APPARATUS, IMAGE FORMING METHOD, AND STORAGE MEDIUM

(71) Applicant: CANON KABUSHIKI KAISHA, Tokyo (JP)

(72) Inventor: Nobuyuki Kojima, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/205,721

(22) Filed: Nov. 30, 2018

(65) Prior Publication Data

US 2019/0182396 A1 Jun. 13, 2019

(30) Foreign Application Priority Data

Dec. 7, 2017 (JP) .............................. JP2017-235290

(51) Int. Cl.
*G06F 15/00* (2006.01)
*H04N 1/00* (2006.01)

(52) U.S. Cl.
CPC ..... *H04N 1/00724* (2013.01); *H04N 1/00095* (2013.01); *H04N 1/00803* (2013.01); *H04N 2201/0094* (2013.01); *H04N 2201/3214* (2013.01); *H04N 2201/3216* (2013.01); *H04N 2201/3232* (2013.01)

(58) Field of Classification Search
CPC ........... H04N 1/00724; H04N 1/00095; H04N 1/00803; H04N 2201/0094; H04N 2201/3214; H04N 2201/3216; H04N 2201/3232
USPC ........................................................ 358/1.15
See application file for complete search history.

(56) References Cited

U.S. PATENT DOCUMENTS

| | | | |
|---|---|---|---|
| 6,501,556 B1 * | 12/2002 | Nishii ..................... | G06K 15/02 358/1.12 |
| 2006/0023243 A1 * | 2/2006 | Asai ................... | H04N 1/00435 358/1.13 |
| 2017/0149999 A1 * | 5/2017 | Jeevanantham ... | H04N 1/32144 |

FOREIGN PATENT DOCUMENTS

JP 2012-147114 A 8/2012

* cited by examiner

*Primary Examiner* — Mark R Milia
(74) *Attorney, Agent, or Firm* — Venable LLP

(57) ABSTRACT

An image forming apparatus acquires an input image generated by reading an image of an original document to be copied, and determination information of whether or not the input image corresponds to a blank. The image forming apparatus controls a printer to print the input image together with a page number on a sheet and output the sheet, according to a determination result indicated by the determination information. At that time, the image forming apparatus controls the printer so as to output a sheet on which the page number is not printed, with respect to the input image determined to correspond to a blank.

10 Claims, 6 Drawing Sheets

FIG. 3A

< BLANK SKIP >
SET COLOR OF ORIGINAL DOCUMENT TO BE SKIPPED

302: WHITE PAPER AND COLOR PAPER
301: WHITE PAPER ONLY

PREVIEW 

ADJUST DETECTION LEVEL 

CANCEL SETTING    OK

FIG. 3B

< PRINT PAGE NUMBER >
SET PRINT POSITION AND CONTENT

351: NUMERAL ONLY | NUMERAL WITH HYPHEN | NUMERAL WITH TOTAL PAGES

352: POSITION     BLANK DOCUMENT     CONTENT

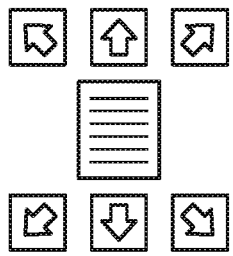

356: DO NOT PRINT

PRINT COLOR — BLACK — 353
PRINT SIZE — 10 POINT — 354
PRINT START NUMERAL — 1 — 355

☐ ADVANCED SETTING

CANCEL SETTING    OK

IMAGE FORMING APPARATUS, IMAGE FORMING METHOD, AND STORAGE MEDIUM

BACKGROUND OF THE INVENTION

Field of the Invention

The present invention relates to an image forming apparatus, an image forming method, and a storage medium.

Description of the Related Art

As a copy function of an image forming apparatus such as a digital copying machine, there is a function to combine an input image obtained by reading an image of an original document with a predetermined additional image, to generate a printed material (printing result). By using this function, in a case where an image of an original document is copied, for example, an image of the original document can be printed on a sheet together with predetermined additional images such as a page number, a date, the number of copies, a stamp, or the like.

Further, an image forming apparatus having a blank original determination function that determines whether an input image corresponding to an image of an original document corresponds to a blank (whether the original document is a blank) may have a blank skip function. The blank skip function is a function that prevents a page corresponding to a blank original from being printed in a case where the original document is determined to correspond to a blank by the blank determination function. In a case where this blank skip function is used, some inconvenience can occur in a layout-related processing due to a change in the sorting order (page order) of the original document. In order to prevent such inconvenience from occurring, for example, a technique has been proposed not to perform a blank removal (a blank skip) in a case where an original document allocated to the back side of a sheet is a blank in a double-sided print (see Japanese Patent Laid-Open No. 2012-147114).

The above-described conventional art has the following problems. For example, in a case where a predetermined image such as a page number is additionally printed in a copy processing of an original document including a blank original, a predetermined image is combined also with a page corresponding to a blank original. As a result, even in a case where a user expects to obtain a printed material including a blank, a predetermined additional image is also printed on a page expected to be a blank.

SUMMARY OF THE INVENTION

The present invention has been made in view of the above problem. The present invention provides a technique to, in an image forming apparatus having a function to additionally print a predetermined image at the time of printing an input image, perform printing in the original document sorting order while outputting a blank for a blank original.

According to one aspect of the present invention, there is provided an image forming apparatus, comprising: a determination unit configured to determine whether or not an input image corresponds to a blank; and a printing unit configured to print the input image together with a predetermined image on a sheet according to a result of a determination by the determination unit and output the sheet, wherein the printing unit outputs a sheet on which the predetermined image is not printed with respect to an input image determined to correspond to a blank.

According to another aspect of the present invention, there is provided an image forming apparatus, comprising: a determination unit configured to determine whether or not an input image corresponds to a blank; an accepting unit configured to accept from a user a setting as to whether or not to print a predetermined image on a sheet together with an input image determined to correspond to a blank by the determination unit; and a control unit configured to control, according to the accepted setting, whether to output a sheet on which an input image corresponding to a blank and the predetermined image are printed, or to output a sheet on which the predetermined image is not printed.

According to still another aspect of the present invention, there is provided an image forming method comprising: determining whether an input image corresponds to a blank; and printing the input image together with a predetermined image on a sheet according to a result of the determination, wherein in the printing, a sheet on which the predetermined image is not printed is output with respect to an input image determined to correspond to a blank.

According to yet another aspect of the present invention, there is provided an image forming method comprising: determining whether or not an input image corresponds to a blank; accepting from a user a setting as to whether or not to print a predetermined image on a sheet together with an input image determined to correspond to a blank; and controlling, according to the accepted setting, whether to output a sheet on which an input image corresponding to a blank and the predetermined image are printed, or to output a sheet on which the predetermined image is not printed.

According to still yet another aspect of the present invention, there is provided a non-transitory computer-readable storage medium storing a computer program for causing a computer to execute an image forming method comprising: determining whether an input image corresponds to a blank; and printing the input image together with a predetermined image on a sheet according to a result of the determination, wherein in the printing, a sheet on which the predetermined image is not printed is output with respect to an input image determined to correspond to a blank.

According to the present invention, it is made possible to, in an image forming apparatus having a function to additionally print a predetermined image at the time of printing an input image, perform printing in the original document sorting order while outputting a blank for a blank original.

Further features of the present invention will become apparent from the following description of exemplary embodiments (with reference to the attached drawings).

BRIEF DESCRIPTION OF THE DRAWINGS

FIG. 3A and FIG. 3B are views illustrating examples of setting screens of a blank skip function and a page number printing function.

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

<Configuration of Image Forming Apparatus>

Figure 1:
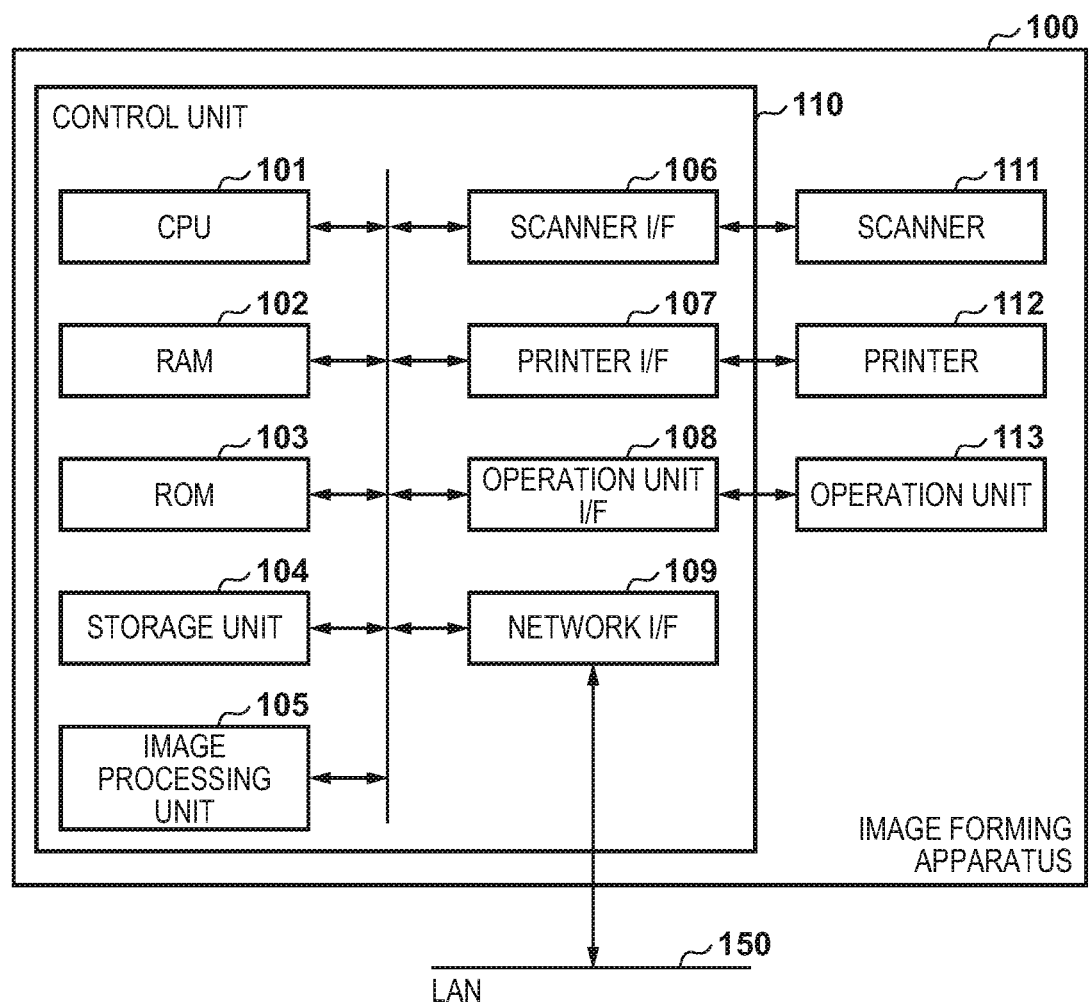
FIG. 1 is a block diagram illustrating an example of a hardware configuration of an image forming apparatus.

With reference to FIG. 1, a configuration of an image forming apparatus 100 according to embodiments will be described. The image forming apparatus 100 is, for example, an image forming apparatus such as a digital copying machine or a Multi-Function Peripheral (MFP). Further, since the image forming apparatus 100 has an image processing function such as image combining, it also functions as an image processing apparatus.

The image forming apparatus 100 includes a control unit 110, and a scanner 111, a printer 112, and an operation unit 113 which are connected to the control unit 110. The control unit 110 is connected to a LAN 150 via a network I/F 109 and is capable of communicating with an external apparatus such as a PC that is communicable via the LAN 150. The control unit 110 includes, as devices connected to the system bus, a CPU 101, a RAM 102, a ROM 103, a storage unit 104, an image processing unit 105, a scanner I/F (interface) 106, a printer I/F 107, an operation unit I/F 108 and a network I/F 109.

The CPU 101 controls the overall operations of the image forming apparatus 100 by controlling each device connected via the system bus. The RAM 102 is used as a temporary storage area such as a main memory and a work area of the CPU 101. The ROM 103 is a boot ROM, and stores a boot program of the system. The storage unit 104 is, for example, a hard disk drive (HDD) or a solid state drive (SSD), and stores various programs such as a program for controlling the operation of the image forming apparatus 100, and various data such as print data and image data.

The CPU 101 executes various processes for controlling the operation of the image forming apparatus 100 by reading out the control program stored in the ROM 103 or the storage unit 104 onto the RAM 102 and executing the control program. Note that, in the present embodiment, an example is described in which one CPU 101 executes each process described later (illustrated in each flowchart), but the present invention is not limited thereto, and the image forming apparatus 100 may be configured such that a plurality of CPUs (processors) cooperates to execute each process.

The image processing unit 105 performs various image processing, such as image editing processing on the image data input via the scanner I/F 106. The scanner I/F 106 is an interface for connecting the scanner 111 and the control unit 110. The printer I/F 107 is an interface for connecting the printer 112 and the control unit 110. The operation unit I/F 108 is an interface for connecting the operation unit 113 and the control unit 110. The network I/F 109 is connected to a network such as the LAN 150 and is a communication I/F for communicating with an external apparatus via the network.

The scanner 111 is an image input device, and reads an image of an original document to generate image data (scan image data). The image data generated by the scanner 111 is used for print processing by the printer 112, or is stored in the storage unit 104. The printer 112 is an image output device, and executes print processing based on image data output from the control unit 110. The image forming apparatus 100 (the control unit 110) can cause the printer 112 to execute the print processing based on the print data received from the external apparatus via the LAN 150 or the image data generated by the scanner 111.

The operation unit 113 includes a liquid crystal display unit having a touch panel function and a keyboard, and displays various screens. The user can input instructions and information to the image forming apparatus 100 via the operation unit 113.

<Configuration of Scanner 111>

Figure 2A:
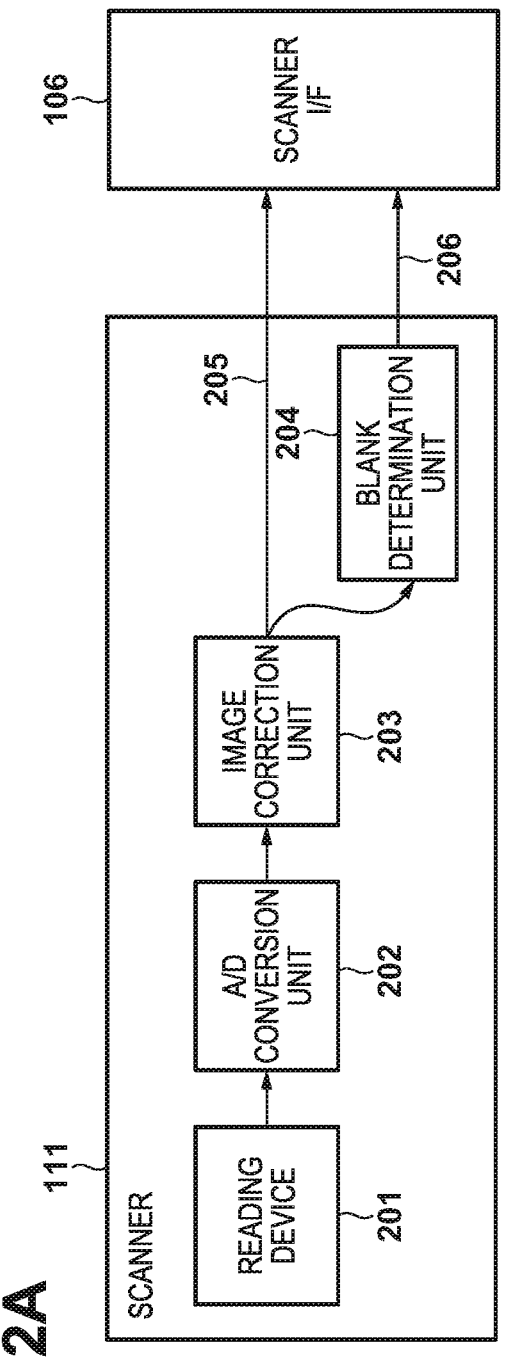
FIG. 2A and FIG. 2B are block diagrams illustrating a configuration example of a scanner and a printer of an image forming apparatus.

Next, the configuration of the scanner 111 will be described with reference to FIG. 2A. The scanner 111 includes a reading device 201, an A/D (analog/digital) conversion unit 202, an image correction unit 203, and a blank determination unit 204.

The reading device 201 optically reads the image of the original document, generates analog image data corresponding to the read image, and outputs the generated image data to the A/D conversion unit 202. The A/D conversion unit 202 performs A/D conversion on the image data generated by the reading device 201, thereby generating digital image data, and outputs the generated image data to the image correction unit 203. The image correction unit 203 performs image processing such as shading correction for matching the levels of the highlight portion (white) and the dark portion (black), MTF correction, and high frequency suppression processing with respect to the input image data. The image data after being processed by the image correction unit 203 is output to the blank determination unit 204 and is also output to the scanner I/F 106 as scan image data 205.

The blank determination unit 204 performs a blank determination to determine whether or not the read original document is a blank (whether or not the input image corresponds to a blank) based on the image data output from the image correction unit 203. Specifically, the blank determination unit 204 divides the entire image corresponding to the image data to be processed into a plurality of areas, extracts a histogram of G components out of the RGB components of the image data for each area, and obtains the variance value from the average value and the histograms. Further, edge detection of each RGB component is performed for each area, the number of edges in each area is obtained, and the variation between areas is normalized. Further, if the variance value is equal to or less than the predetermined threshold value and the edge variation is equal to or less than the predetermined threshold value, the read original document is determined to correspond to a blank. The blank determination unit 204 outputs information indicating the result of blank determination to the scanner I/F 106 as determination information 206. The scan image data 205 and the determination information 206 are transmitted to the control unit 110 (CPU 101) via the scanner I/F 106.

<Configuration of Printer>

Figure 2B:
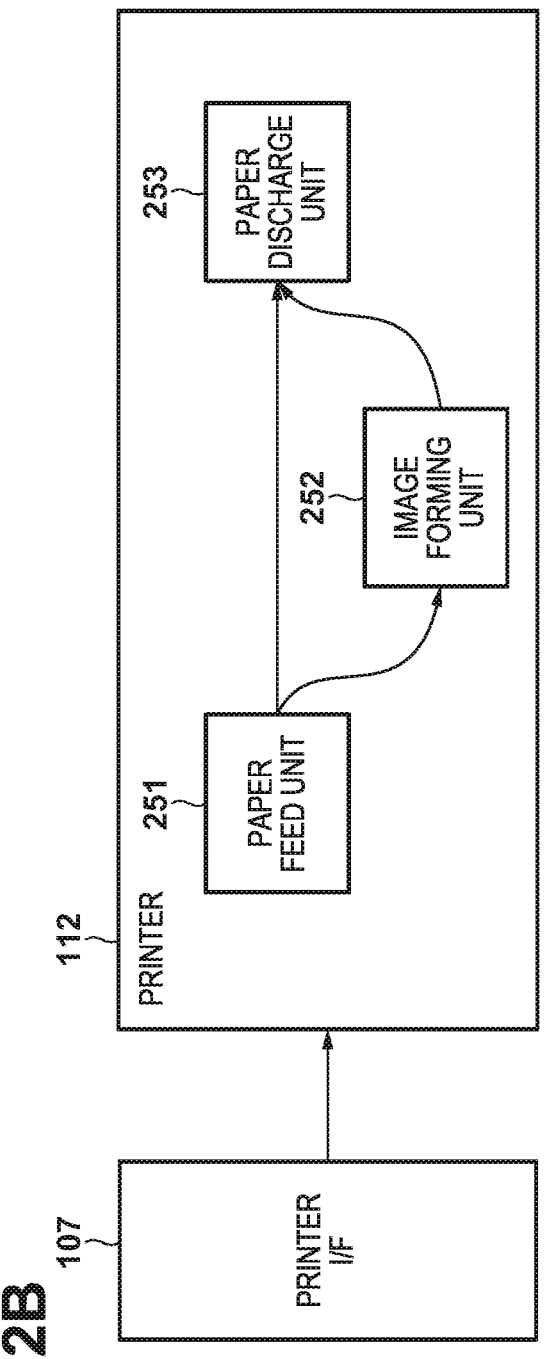

Next, the configuration of the printer 112 will be described with reference to FIG. 2B. The printer 112 includes a paper feed unit 251, an image forming unit 252, and a paper discharge unit 253.

The paper feed unit 251 is constituted by one or more paper feed stages in which a sheet for printing is set in advance. The image forming unit 252 forms an image on the sheet fed from the paper feed unit 251. The paper discharge unit 253 is constituted by one or more paper discharge stages to which a sheet on which an image is formed by the image forming unit 252 is discharged. Note that there may be a case in which a blank skip function, described later, causes only the sheet to be conveyed from the paper feed unit 251 to the paper discharge unit 253, without image formation being performed by the image forming unit 252.

The printer 112 receives, from the control unit 110 via the printer I/F 107, a command instructing the execution of the printing operation and the image data generated by the image processing unit 105. In accordance with the received command, the printer 112 feeds the sheet from the paper feed stage designated by the command to the conveying path, and causes the image forming unit 252 to form (print) the image on the sheet. Subsequently, the printer 112 discharges the sheet on which the image is printed to the sheet discharge stage designated by the command.

<Blank Skip Function>

The image forming apparatus 100 according to the present embodiment has a blank skip function in addition to the blank determination function by the blank determination unit 204. The blank skip function is a function that prevents the copy processing of an original document determined to correspond to a blank by the blank determination function at the time of performing the copy processing of the original document with more than one page.

FIG. 3A illustrates an example of a setting screen pertaining to the blank skip function. The setting screen 300 illustrated in FIG. 3A is displayed on the operation unit 113 based on an operation by the user on the operation unit 113. On the setting screen 300, white only (button 301) or white and non-white plain colors (button 302) may be set as reference colors for the blank determination. The CPU 101 sets the blank skip function according to a selection by the user on the setting screen 300. Further, in a case where neither of the buttons 301, 302 is selected on the setting screen 300, the CPU 101 performs a setting in which the blank skip function is not used. Note that, no charge accrues for the original document for which a copy processing has been prevented by the blank skip function, because no printing on a sheet is made.

<Page Number Printing Function>

The image forming apparatus 100 according to the present embodiment has a function to, in the copy processing of the original document, additionally print on a sheet predetermined images such as a page number, the number of copies, a date, a stamp, and the like, together with an image (input image) read from the original document. In the present embodiment, as an example of such a function, a page number printing function for printing a page number together with an input image will be described.

FIG. 3B illustrates an example of a setting screen pertaining to the page number printing function. The setting screen 350 illustrated in FIG. 3B is displayed on the operation unit 113 based on an operation by the user on the operation unit 113. On the setting screen 350, the format of the page number to be printed (in the present example, numeral only, numeral with a hyphen, numeral with total pages) and the printing positions of a page number can be respectively set using the button groups 351 and the button groups 352. Further, on the setting screen 350, the printing color, the printing size, and the printing start numeral of the page number can be respectively set using the selection buttons 353 and 354 and the input column 355.

On the setting screen 350, setting whether or not to print the page number on a sheet (a non-printing setting of a page number) is further possible at the time of copying a blank original (in a case where an original document to be copied corresponds to a blank), using the selection button 356. Namely, the selection button 356 is an example of a unit to accept a setting from the user of whether or not to print on a sheet a predetermined image such as a page number together with an input image determined to correspond to a blank. Note that in a case where a blank skip function is set to be used, a non-printing setting of a page number is not needed. Therefore, in this case, the selection button 356 is displayed such that operation by the user is disabled, for example, by shading.

<Example of Printed Material by Copy Processing of Original Document>

Figure 4:
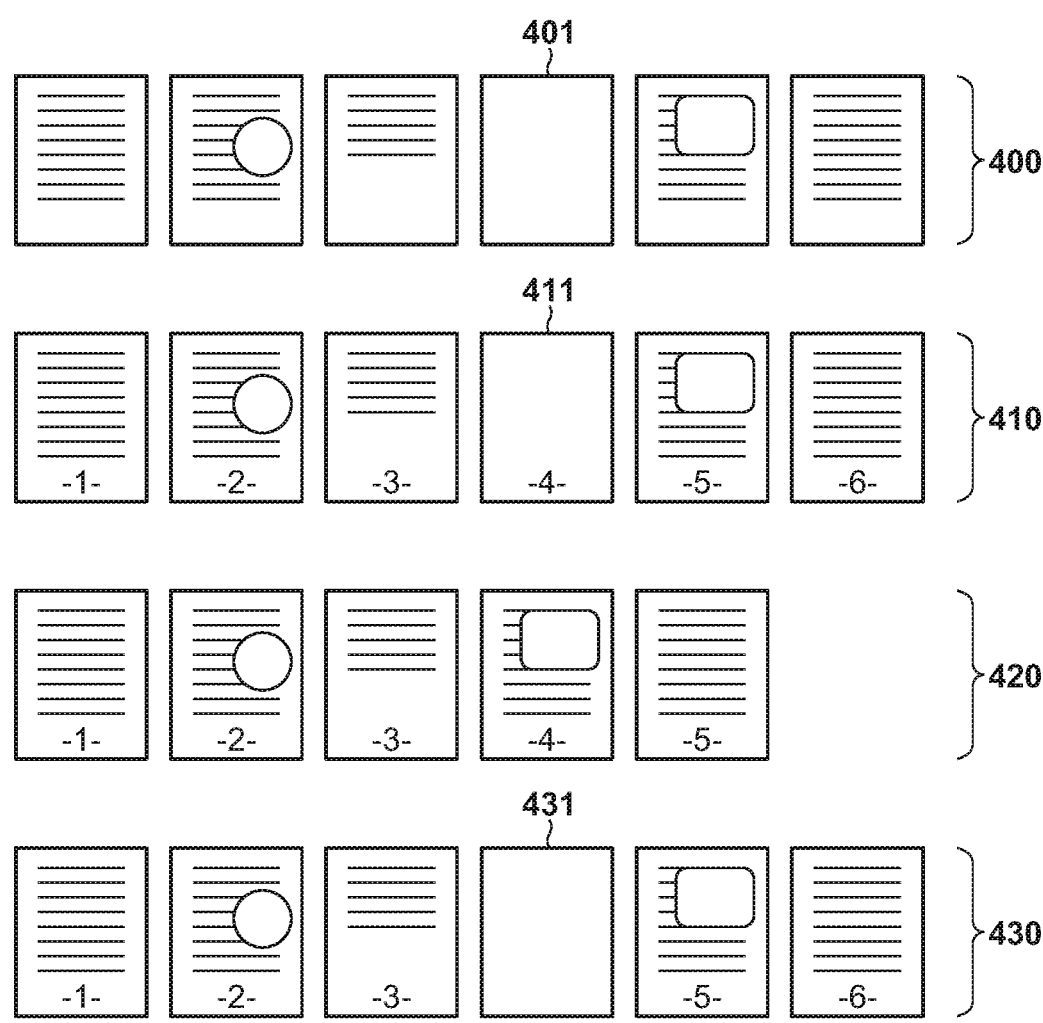
FIG. 4 is a diagram illustrating an example of an original document to be copied including a blank original and printed materials obtained by a copy processing of the original document.

Next, with reference to FIG. 4, a description will be given of the difference in printed materials (printing result) outputted by the copy processing depending on the settings of the blank skip function and the page number printing function. FIG. 4 illustrates a six-page original document 400 to be copied including a blank original 401 and an example of printed materials (printed materials 410, 420, 430) outputted by the copy processing of the six-page original document 400. Whereas, as described below, the printed materials 410, 420, 430 illustrate printed materials each outputted when different settings are made.

In the image forming apparatus 100, in a case where the blank skip function is not used and the page number printing function is used, the printed material 410 is output by the copy processing of the original document 400. However, the above-described non-printing setting of a page number, that prevents a page number from being printed on a sheet for a printing corresponding to a blank original, has not been done. In this case, a page number is printed on the fourth sheet 411 included in the printed material 410, which is the sheet corresponding to the blank original 401.

In the image forming apparatus 100, in a case where both the blank skip function and the page number printing function are used, the printed material 420 is outputted by the copy processing of the original document 400. In this case, since the image of the blank original 401 is not printed on a sheet, the printed material 420 does not include the sheet corresponding to the blank original 401.

In the image forming apparatus 100, in the case where the blank skip function is not used and the page number printing function is used, if the above-described non-printing setting is made, the printed material 430 is outputted by the copy processing of the original document 400. In this case, unlike the printed material 410, a page number is not printed on the fourth sheet 431 corresponding to the blank original 401.

In the present embodiment, output of a printed material such as the printed material 430 is made possible by enabling the non-printing setting that prevents a page number from being printed on a sheet for a printing corresponding to a blank original. Specifically, the blank determination unit 204 determines whether or not the input image generated by reading the image of the original document to be copied corresponds to a blank. The CPU 101 controls the printer 112 so as to print the input image together with the page number (predetermined image) on a sheet and output the sheet, according to the result of the determination by the blank determination unit 204. At that time, the CPU 101 controls the printer 112 so as to output a sheet on which a page number is not printed, for an input image determined to correspond to a blank.

<Processing Procedure for Single-Sided Printing>

Figure 5:
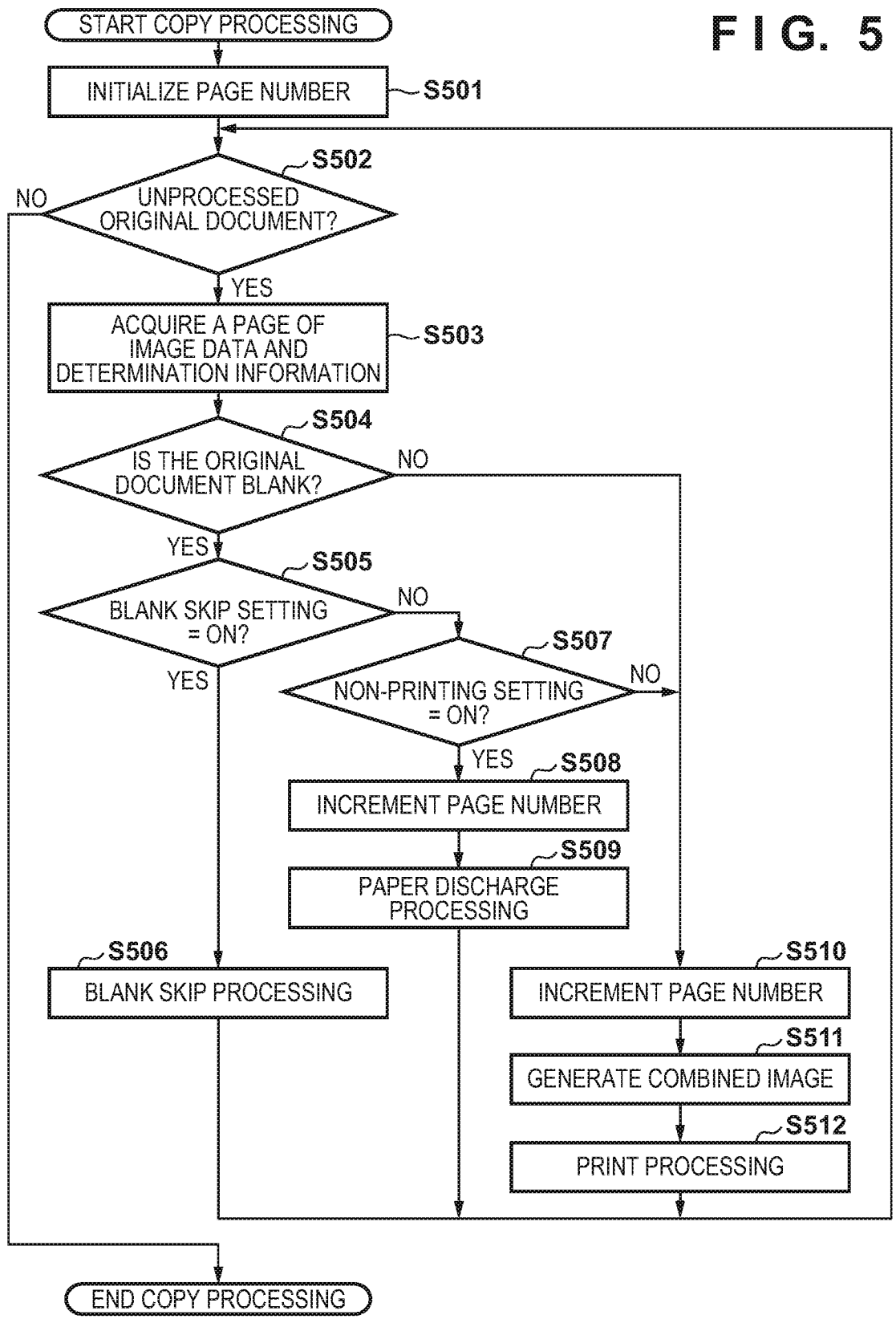
FIG. 5 is a flowchart illustrating a processing procedure in single-sided printing.

Next, with reference to the flowchart of FIG. 5, the procedure of the copy processing at the time of single-sided printing, in a case where the above-described page number printing function is used, will be described. The processing of each step illustrated in FIG. 5 can be realized by the CPU 101 by reading out and executing the program stored in the ROM 103 or the storage unit 104.

In a case where the original document with one or more pages to be copied is set in the ADF (automatic original document feeder) of the scanner 111, and an instruction is made by the user via the operation unit 113 to start the copy processing, the CPU 101 starts executing the copy processing. In the present embodiment, the CPU 101 accepts settings of the blank skip function and the page number print function from the user via the setting screens 300 and 350 displayed on the operation unit 113, before accepting the instruction to start the copy processing. The CPU 101 executes a copy processing according to the setting accepted from the user. Note that the settings accepted via the setting screens 300 and 350 are stored in the storage unit 104 and are read from the storage unit 104 as necessary.

When the execution of a copy processing is started, the CPU 101 performs reading (scanning) of the original document by controlling the scanner 111. In accordance with an instruction from the CPU 101, the scanner 111 performs reading (scanning) of an image of the original document set in the ADF page-by-page to generate corresponding scan image data 205 and determination information 206. The CPU 101 stores the scan image data 205 and the determination information 206 output from the scanner 111, in the storage unit 104 for each page of the original document.

In step S501, the CPU 101 acquires the print start numerical value set using the setting screen 350 from the storage unit 104, and stores the value obtained by subtracting one from the acquired value in the RAM 102 as the initial value of the page number. Next, in step S502, the CPU 101 determines whether or not there is an unprocessed original document remaining. If there is no unprocessed original document remaining, the CPU 101 ends the copy processing, and if there is an unprocessed original document remaining, the CPU 101 advances the processing to step S503.

In step S503, the CPU 101 acquires the scan image data 205, which is the image data of the input image corresponding to the one page of the original document to be processed, and the determination information 206 stored in the storage unit 104. Further, in step S504, the CPU 101 determines whether or not the original document to be processed is a blank based on the acquired determination information. If the original document is determined to be a blank, the CPU 101 advances the process to step S505. If the original document is determined not to be a blank, the CPU 101 advances the process to step S510.

If the original document is determined not to be a blank ("NO" in step S504), the CPU 101 increments the page number stored in the RAM 102 by 1 in step S510. Next, in S511, the CPU 101 generates a combined image for print processing by controlling the image processing unit 105. The image processing unit 105 generates an image of the page number stored in the RAM 102 according to the print setting of the page number (for example, the format of the page number set using the setting screen 350, the printing position, and the like). Further, the image processing unit 105 generates a combined image by combining the generated image with the scanned image.

Next, in step S512, the CPU 101 causes the printer 112 to execute a print processing of the combined image. Specifically, the CPU 101 outputs the image data of the combined image to the printer 112, and causes the printer 112 to print the combined image on the sheet. Namely, for the input image determined not to correspond to a blank, the printer 112 prints the input image and the page number (the predetermined image) on the sheet and outputs the sheet. Upon completion of the print processing of the combined image, the CPU 101 returns the process to step S502 to process the next original document.

On the other hand, if it is determined that the original document is a blank ("YES" in step S504), the CPU 101 determines in step S505 whether or not a blank skip setting to use the blank skip function is made. In a case where the blank skip setting is made ("YES" in step S505), the CPU 101 advances the processing to step S506. In step S506, the CPU 101 performs a blank skipping process to discard the image data acquired in step S503 without either performing the print processing or discharge processing of the sheet, and returns the process to step S502. As a result, the CPU 101 shifts to processing of the next original document. In such manner, in a case where the blank skip setting is made, a printed material such as the printed material 420 in FIG. 4 is finally obtained.

If the blank skip setting is not made ("NO" in step S505), the CPU 101 advances the process to step S507. In step S507, the CPU 101 determines whether or not the non-printing setting of the page number of the blank original is made. As described above, the non-printing setting is a setting made using the setting screen 350 as to whether or not to print the page number on the sheet at the time of copying the blank original. In a case where the non-printing setting is not made ("NO" in step S507), the CPU 101 performs the same processing as in the case where the original document is determined not to be blank in steps S510 to S512.

Upon completion of the print processing of step S512, the CPU 101 returns the process to step S502. In such manner, in a case where the non-printing setting of the page number is not made, a printed material such as the printed material 410 in FIG. 4 is finally obtained.

In a case where the non-printing setting is made ("YES" in step S507), the CPU 101 advances the process to step S508. In step S508, the CPU 101 increments the page number stored in the RAM 102 by 1. Subsequently, in step S509, the CPU 101 causes the printer 112 to perform the sheet discharge processing. This paper discharge processing is a process without printing of an image on a sheet, in which the sheet fed from the paper feed unit 251 is conveyed to the paper discharge unit 253 without the image being printed on the sheet, and discharged. Namely, with respect to the input image determined to correspond to a blank, the printer 112 prints neither the input image nor the page number (the predetermined image) on the sheet, and outputs a sheet on which neither the input image nor the page number is printed (a sheet on which no image is printed).

Upon completion of the sheet discharge processing in step S509, the CPU 101 returns the process to step S502 to process the next original document. In this manner, in a case where the non-printing setting of the page number is made, a printed material such as the printed material 430 in FIG. 4 is finally obtained. In this case, since the page number is not printed on the sheet corresponding to the blank original, no charge for a copy processing accrues for the copying of the blank original.

<Processing Procedure for Double-Sided Printing>

Figure 6:
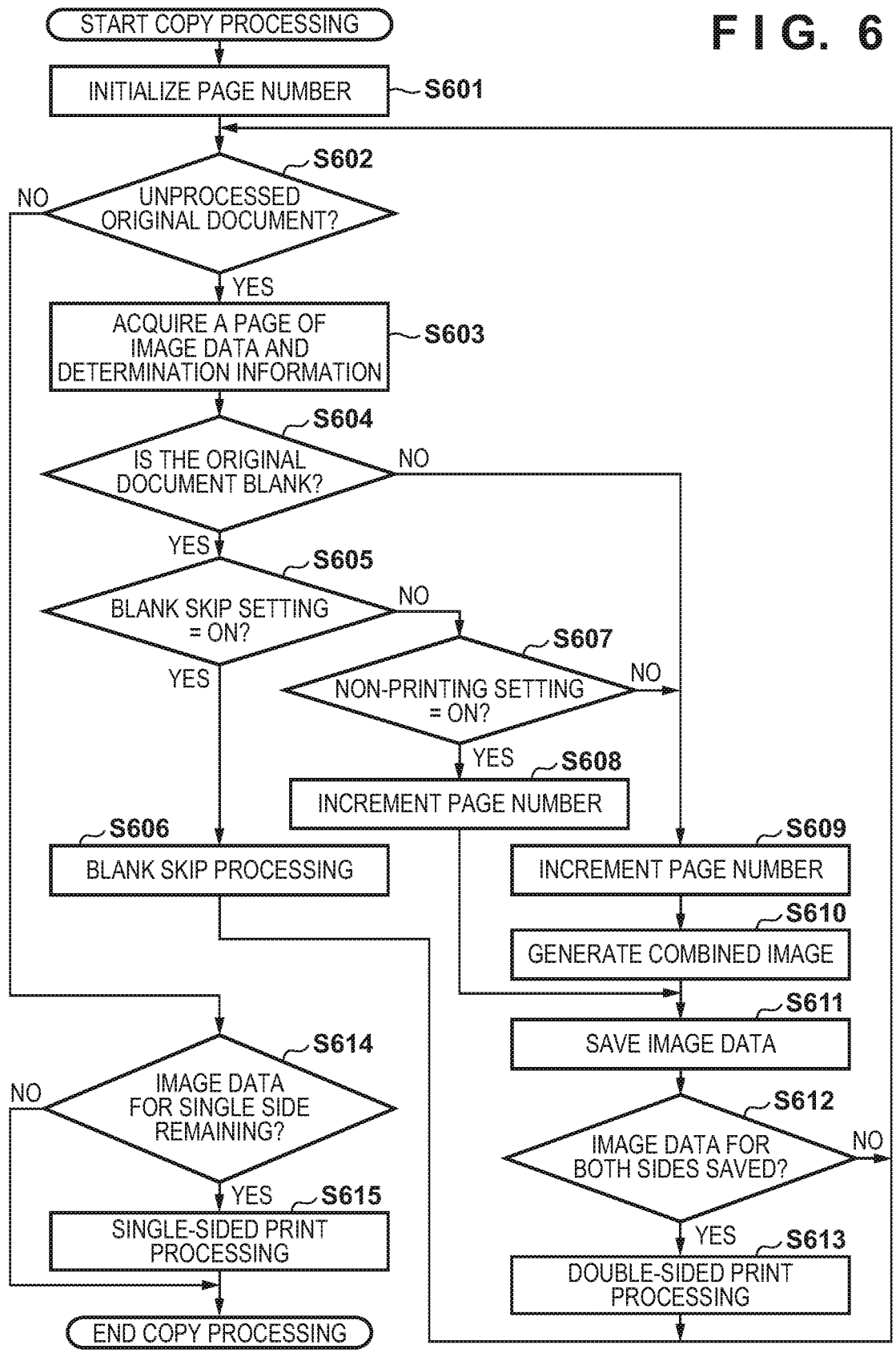
FIG. 6 is a flowchart illustrating a processing procedure in double-sided printing.

Next, referring to the flowchart of FIG. 6, the procedure of the copy processing at the time of double-sided printing in a case where the above-described page number printing function is used will be described. The processing of each step illustrated in FIG. 6 can be realized by the CPU 101 by reading out and executing the program stored in the ROM 103 or the storage unit 104.

In a case where the original document with one or more pages to be copied is set in the ADF (automatic original document feeder) of the scanner 111, and an instruction is made by the user via the operation unit 113 to start the copy processing, the CPU 101 starts executing the copy processing, as in the case of the single-sided printing described above. Note that, the original document to be copied may be a single-sided original document or a double-sided original document. For example, a single-sided original document may be copied by double-sided printing, or a double-sided original document may be copied by double-sided printing.

In accordance with an instruction from the CPU 101, the scanner 111 performs reading (scanning) of an image of the original document set in the ADF page-by-page to generate corresponding scan image data 205 and determination information 206. The CPU 101 stores the scan image data 205 and the determination information 206 output from the scanner 111, in the storage unit 104 for each page of the original document.

In step S601, the CPU 101 acquires the print start numerical value set using the setting screen 350 from the storage unit 104, and stores the value obtained by subtracting one from the acquired value in the RAM 102 as the initial value of the page number. Next, in step S602, the CPU 101 determines whether or not there is an unprocessed original document remaining. If there is no unprocessed original document remaining, the CPU 101 advances the process to step S614, and if there is an unprocessed original document remaining, the CPU 101 advances the process to step S603.

In step S603, the CPU 101 acquires the scan image data 205 corresponding to the one page of the original document to be processed and the determination information 206 stored in the storage unit 104. Further, in step S604, the CPU 101 determines whether or not the original document to be processed is a blank based on the acquired determination information. If the original document is determined to be a blank, the CPU 101 advances the process to step S605. If the original document is determined not to be a blank, the CPU 101 advances the process to step S609.

If the original document is determined not to be a blank ("NO" in step S604), the CPU 101 increments the page number stored in the RAM 102 by 1 in step S609 similarly to step S510. Next, in step S610, the CPU 101 controls the image processing unit 105 to generate a combined image for print processing, similarly to step S511. Subsequently, in step S611, the CPU 101 temporarily stores the image data of the combined image in the storage unit 104, and advances the process to step S612.

In step S612, the CPU 101 determines whether or not the image data for both sides is stored in the storage unit 104, for which print processing is yet to be performed. In a case where the image data for both sides is not stored in the storage unit 104 (image data for one side is lacking), for which print processing is yet to be performed ("NO" in step S612), the CPU 101 returns the process to step S602 to process the next original document. On the other hand, in a case where the image data for both sides is stored in the storage unit 104, for which print processing is yet to be performed ("YES" in step S612), the CPU 101 causes the printer 112 to execute double-sided print processing in step S613 based on the image data for both sides. Upon completion of the double-sided print processing, the CPU 101 returns the process to step S602 to process the next original document.

On the other hand, if the original document is determined to be a blank ("YES" in step S604), the CPU 101 determines in step S605 whether or not the blank skip setting is made. In a case where the blank skip setting is made ("YES" in step S605), the CPU 101 advances the process to step S606. In step S606, similarly to step S506, the CPU 101 performs blank skip processing and returns the process to step S602.

Further, in a case where the blank skip setting is not made ("NO" in step S605), the CPU 101 advances the process to step S607. In step S607, the CPU 101 determines whether or not the non-printing setting of a page number of the blank original is made. In a case where the non-printing setting is not made ("NO" in step S607), the CPU 101 performs the same processing as in the case where the original document is determined not to be blank in steps S609 to S613. Namely, the CPU 101 increments the page number by 1 and combines the image of the page number with the scanned image. In a case where the double-sided print processing of step S613 is completed or in a case where the image data for both sides is not stored in the storage unit 104, for which print processing is yet to be performed, the CPU 101 returns the process to step S602.

In a case where non-printing setting is made ("YES" in step S607), the CPU 101 advances the process to step S608. In step S608, the CPU 101 increments the page number stored in the RAM 102 by 1 and advances the process to step S611. In step S611, the CPU 101 saves the scanned image data (image data corresponding to a blank) in the storage unit 104 as it is without combining the image of the page number with the scanned image. Subsequently, the above-described processing is performed in steps S612 and S613. As a result, no page number is printed on the sheet for a page corresponding to the blank original.

In step S602, if there is no unprocessed original document remaining, the CPU 101 advances the process to step S614. In step S614, the CPU 101 determines whether or not there is image data for a single side (that corresponds to the last page of the original document) remaining in the storage unit 104 for which print processing is yet to be performed. In the case where there is no image data for a single side remaining, the CPU 101 ends the process. On the other hand, in the case where there is image data for a single side remaining, the CPU 101 causes the printer 112 to perform a single-sided print processing based on the image data in step S615, and ends the processing.

As described above, in the present embodiment, the blank determination unit 204 determines whether or not the input image generated by reading the image of the original document to be copied corresponds to a blank. The CPU 101 controls the printer 112 so as to print the input image together with the page number on a sheet and output the sheet in accordance with the determination result by the blank determination unit 204. At that time, the CPU 101 controls the printer 112 so as to output a sheet on which a page number is not printed, for an input image determined to correspond to a blank. Thus, in an image forming apparatus having a function to additionally print a predetermined image (a page number or the like) at the time of printing an input image, printing is made possible in which while a blank page is output for a blank original, the printing is performed in the order of the original documents.

Further, in the above-described embodiment, an example is described in which, using the selection button 356 on the setting screen 350, a setting by a user is accepted as to whether to print a predetermined image such as a page number on a sheet together with an input image determined to be a blank by the blank determination unit 204. In this case, the CPU 101, in accordance with a setting accepted from the user, controls whether to output a sheet on which an input image corresponding to a blank and a predetermined image are printed, or to print a sheet on which the predetermined image is not printed. In one embodiment, the sheet on which the predetermined image is not printed is a sheet on which an input image corresponding to a blank and the predetermined image are not printed. In this manner, with respect to a blank original, the CPU 101 controls whether to output a blank page, or to output a page on which a predetermined image is printed in accordance with a setting made by the user. As a result, in an image forming apparatus having a function to additionally print a predetermined image (a page number or the like) at the time of printing an input image, printing is made possible in which, while a blank page is output for a blank original, the printing is performed in the order of the original documents, according to the expectations by the user.

Note that, in the above-described embodiment, a case is described in which the scanned image of the original document is used as the input image, but the input image may be an image corresponding to image data (print data) received from the external apparatus via the LAN 150. In that case, instead of the blank determination unit 204 of the scanner 111, the CPU 101 or the image processing unit 105 may perform a blank determination to determine whether or not the input image corresponds to a blank based on the image data received from the external apparatus. Further, in the above-described embodiment, the page number printing function is described as an example. However, the predetermined image to be printed together with the input image is not limited to the page number, but may be an image of a date, number of copies printed, a stamp, and the like. Even in such a case, it is possible to obtain an advantage similar to that of the embodiment described above.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-235290, filed Dec. 7, 2017, which is hereby incorporated by reference herein in its entirety.

What is claimed is:

1. An image forming apparatus, comprising:
   printer;
   at least one memory that stores a set of instructions; and
   at least one processor that executes the instructions, the instructions, when executed, causing the information processing apparatus to perform operations comprising:
   estimating whether or not an input page image is a page image including no object based on an analysis result obtained by analyzing the input page image;
   setting, based on a user operation, whether or not to print a page number corresponding to the input page image on a sheet corresponding to the input page image estimated to be a page image including no object in the estimation; and
   in a case where a plurality of input page images are to be printed,
   controlling the printer to, with respect to a first type of input page image estimated not to be a page image including no object in the estimation, perform print processing for printing the input page image together with an image indicating the page number corresponding to the input page image on a sheet and output the sheet for which the print processing is performed and controlling to increment the page number to be printed on a next input page image, and
   controlling the printer to, with respect to a second type of input page image estimated to be a page image including no object in the estimation, output a sheet without performing print processing for printing the input page image and the image indicating the page number corresponding to the input page image on the sheet, in a case where it is set not to print the page number corresponding to the input page image on a sheet corresponding to the input page image estimated to be a page image including no object, and
   controlling the printer to, with respect to the second type of input page image estimated to be a page image including no object in the estimation, perform print processing for printing the image indicating the page number corresponding to the input page image on a sheet corresponding to the input page image and output the sheet for which the print processing is performed and controlling to increment the page number to be printed on the next input page image, in a case where it is set to print the image indicating the page number corresponding to the input page image of image on a sheet corresponding to the input page image estimated to be a page image including no object,
   wherein the page number to be printed on the next input page image is incremented even in a case where the print processing is not performed with respect to the second type of input page image.

2. The image forming apparatus according to claim 1, further comprising a scanner that scans an image of an original document to generate image data of the input page image.

3. The image forming apparatus according to claim 1, further comprising a communication interface,
wherein the operations further comprises:
receiving image data of the input page image from an external apparatus via communication interface.

4. The image forming apparatus according to claim 1, further comprising a display device,
wherein the operations further comprising:
displaying on the display device a setting screen for accepting from a user a setting as to whether or not to print the image indicting the page number corresponding to the input page image on a sheet corresponding to the input page image estimated to be a page image including no object.

5. The image forming apparatus according to claim 1, wherein even if the sheet is output without performing the print processing with respect to the second type of input page image, a result of the outputting the sheet is not used for calculation of a printing fee in the image forming apparatus.

6. The image forming apparatus according to claim 5, wherein if the sheet is output with performing the image indicating the page number corresponding to the input page image including no object on a sheet corresponding to the input page image including no object, a result of the outputting the sheet is used for calculation of a printing fee in the image forming apparatus.

7. The image forming apparatus according to claim 1, wherein the operations further comprise:
setting, based on a user operation, whether or not to skip printing on a sheet corresponding to the input page image estimated to be a page image including no object in the estimation,
wherein in a case where a plurality of input page images are to be printed,
the printer is controlled not to output a sheet that includes the second type of input page image, in accordance with being set to skip printing on a sheet corresponding to the input page image estimated to be a page image including no object in the estimation, and
wherein in a case where the printer is controlled not to output a sheet that includes the second type of input page image, the page number to be printed on the next input page image is not incremented.

8. The image forming apparatus according to claim 1, wherein the image forming apparatus has a copy function, and the image forming apparatus further comprises:
a scanner device that reads an original and generate input page image,
wherein in a case where double-sided printing is designated as a setting for the copy function and a plurality of input page images are generated by the scanner to be printed, controlling for making an output mode of a printed material different as to whether or not to print a page number corresponding to the input page image on a sheet corresponding to the input page image estimated to be a page image including no object is performed.

9. An image forming method using a printer, comprising:
estimating whether an input page image is a page image including no object based on an analysis result obtained by analyzing the input page image;
setting, based on a user operation, whether or not to print a page number corresponding to the input page image on a sheet corresponding to the input page image estimated to be a page image including no object in the estimation; and in a case where a plurality of input page images are to be printed,
controlling the printer to, with respect to a first type of input page image estimated not to be a page image including no object in the estimation, perform print processing for printing the input page image together with an image indicating the page number corresponding to the input page image on a sheet and output the sheet for which the print processing is performed and controlling to increment the page number to be printed on a next input page image, and
controlling the printer to, with respect to a second type of input page image estimated to be a page image including no object in the estimation, output a sheet without performing print processing for printing the input page image and the image indicating the page number corresponding to the input page image on the sheet, in a case where it is set not to print the page number corresponding to the input page image on a sheet corresponding to the input page image estimated to be a page image including no object, and
controlling the printer to, with respect to the second type of input page image estimated to be a page image including no object in the estimation, perform print processing for printing the image indicating the page number corresponding to the input page image on a sheet corresponding to the input page image and output the sheet for which the print processing is performed and controlling to increment the page number to be printed on the next input page image, in a case where it is set to print the image indicating the page number corresponding to the input page image of image on a sheet corresponding to the input page image estimated to be a page image including no object,
wherein the page number to be printed on the next input page image is incremented even in a case where the print processing is not performed with respect to the second type of input page image.

10. A non-transitory computer-readable storage medium storing a computer program for causing a computer to execute an image forming method using a printer comprising:
estimating whether an input page image is a page image including no object based on an analysis result obtained by analyzing the input page image;
setting, based on a user operation, whether or not to print a page number corresponding to the input page image on a sheet corresponding to the input page image estimated to be a page image including no object in the estimation; and
in a case where a plurality of input page images are to be printed,
controlling the printer to, with respect to a first type of input page image estimated not to be a page image including no object in the estimation, perform print processing for printing the input page image together with an image indicating the page number corresponding to the input page image on a sheet and output the sheet for which the print processing is performed and controlling to increment the page number to be printed on a next input page image, and
controlling the printer to, with respect to a second type of input page image estimated to be a page image including no object in the estimation, output a sheet without performing print processing for printing the input page image and the predetermined type of image indicating the page number corresponding to the input page image on the sheet, in a case where it is set not to print the page number corresponding to the input page image on a sheet corresponding to the input page image estimated to be a page image including no object, and controlling the printer to, with respect to the second type of input page image estimated to be a page image including no object in the estimation, perform print processing for printing the image indicating the page number corresponding to the input page image on a sheet corresponding to the input page image and output the sheet for which the print processing is performed and controlling to increment the page number to be printed on the next input page image, in a case where it is set to print the image indicating the page number corresponding to the input page image of image on a sheet corresponding to the input page image estimated to be a page image including no object, wherein the page number to be printed on the next input page image is incremented even in a case where the print processing is not performed with respect to the second type of input page image.

* * * * *